(12) United States Patent
Augustine et al.

(10) Patent No.: US 9,038,359 B2
(45) Date of Patent: May 26, 2015

(54) ROTARY IMPLEMENT HAVING HARD METALLIC LAYER AND METHOD THEREFOR

(71) Applicants: Brent A. Augustine, East Moline, IL (US); James W. Musser, Cary, NC (US); Amber Resch, Burnett, WI (US)

(72) Inventors: Brent A. Augustine, East Moline, IL (US); James W. Musser, Cary, NC (US); Amber Resch, Burnett, WI (US)

(73) Assignee: Deere & Company, Moline, IL (US)

( * ) Notice: Subject to any disclaimer, the term of this patent is extended or adjusted under 35 U.S.C. 154(b) by 253 days.

(21) Appl. No.: 13/674,485

(22) Filed: Nov. 12, 2012

(65) Prior Publication Data

US 2014/0130473 A1   May 15, 2014

(51) Int. Cl.
| | |
|---|---|
| A01D 34/73 | (2006.01) |
| B22F 3/22 | (2006.01) |
| C23C 24/10 | (2006.01) |
| B22F 3/105 | (2006.01) |
| B22F 3/115 | (2006.01) |
| B23K 10/02 | (2006.01) |
| B22F 7/08 | (2006.01) |
| B22F 5/00 | (2006.01) |

(52) U.S. Cl.
CPC ............ *A01D 34/73* (2013.01); *B22F 3/1055* (2013.01); *B22F 3/115* (2013.01); *B22F 3/22* (2013.01); *B23K 10/02* (2013.01); *B22F 7/08* (2013.01); *B22F 2005/001* (2013.01); *C23C 24/103* (2013.01); *C23C 24/106* (2013.01)

(58) Field of Classification Search
CPC ... A01D 34/73; A01D 34/005; B23D 35/001; C23C 26/00; C23C 2/28; C23C 4/18; C22F 1/10

USPC ........... 30/350, 346.54, 346.53, 346.55, 345, 30/121.5, 309, 347; 56/102, 53, 289, 255, 56/295, 296, 299, 16.7; 419/8, 10, 11, 23, 419/49, 52; 51/297, 307

See application file for complete search history.

(56) References Cited

U.S. PATENT DOCUMENTS

| | | |
|---|---|---|
| 3,975,891 A | 8/1976 | Gunther |
| 4,936,912 A | 6/1990 | Revankar |
| 4,945,640 A * | 8/1990 | Garg et al. ...................... 30/350 |
| 4,954,058 A | 9/1990 | Revankar |
| 5,027,878 A | 7/1991 | Revankar et al. |
| 5,190,091 A | 3/1993 | Revanker |
| 5,190,092 A | 3/1993 | Revanker |
| 5,267,600 A | 12/1993 | Revanker |
| 5,288,353 A | 2/1994 | Revanker |
| 5,299,620 A | 4/1994 | Revanker |
| 5,383,513 A | 1/1995 | Revanker |
| 5,443,916 A | 8/1995 | Revanker |
| 5,879,743 A | 3/1999 | Revanker |

(Continued)

*Primary Examiner* — Robert Pezzuto
(74) *Attorney, Agent, or Firm* — Carlson, Gaskey & Olds, P.C.

(57) ABSTRACT

A rotary implement includes a metallic body that is rotatable around an axis. The metallic body includes a tapered leading edge having an interface surface and an opposite, free surface. The metallic body has a first composition. A metallic layer has a first side surface that is attached to the interface surface and a free, second side surface opposite from the first side surface. The metallic layer has a second, different composition from the first composition. A rotary machine can include an actuator and the rotary implement operably coupled to the actuator. A method for making a rotary implement includes providing the metallic body that has the tapered leading edge having the interface surface and the opposite, free surface. The metallic layer is then attached to the interface surface of the metallic body.

20 Claims, 3 Drawing Sheets

(56) References Cited

U.S. PATENT DOCUMENTS

| | | | |
|---|---|---|---|
| 6,067,784 A * | 5/2000 | Jordan | 56/102 |
| 6,146,476 A | 11/2000 | Boyer | |
| 6,490,850 B1 | 12/2002 | Seegert et al. | |
| 6,948,784 B2 | 9/2005 | Wodrich et al. | |
| 7,116,097 B2 | 10/2006 | Revanker | |
| 7,163,754 B2 | 1/2007 | Revanker | |
| 7,632,175 B2 | 12/2009 | Freyvogel | |
| 7,922,563 B2 | 4/2011 | Freyvogel | |
| 8,127,522 B2 | 3/2012 | Campbell | |
| 8,778,259 B2 * | 7/2014 | Beckmann | 419/8 |

* cited by examiner

ROTARY IMPLEMENT HAVING HARD METALLIC LAYER AND METHOD THEREFOR

BACKGROUND

This disclosure relates to rotary implements that have a hard protective layer. Rotary implements, such as mower blades, coulter blades and the like, typically have one or more leading edges that serve as working surfaces. For example, the working surface of a mower blade is a cutting edge. The working surface of a coulter blade may have a wavy, notched or plain/smooth geometry and may be blunt to interact with soil for planting and seeding. To protect the working surfaces from stones, wear and the like, such implements may include a protective coating.

SUMMARY

Disclosed is a rotary implement that includes a metallic body that is rotatable around an axis. The metallic body includes a tapered leading edge that has an interface surface and an opposite, free surface. The metallic body has a first composition. A metallic layer has a first side surface that is attached to the interface surface and a free, second side surface opposite from the first side surface. The metallic layer has a second, different composition from the first composition.

In another aspect, a rotary machine includes an actuator and the rotary implement operably coupled to the actuator.

Also disclosed is a method for making a rotary implement. The method includes providing a metallic body that has a tapered leading edge having an interface surface and an opposite, free surface. The metallic body has a first composition. A metallic layer is then attached to the metallic body. The metallic layer includes a first side surface that is attached to the interface surface and a free, second side surface opposite from the first side surface. The metallic layer has a second, different composition from the first composition.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
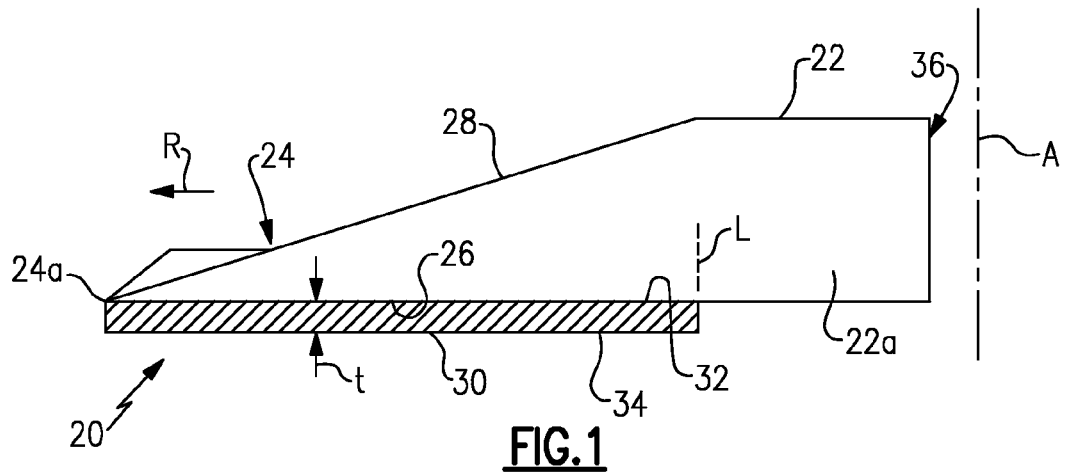
FIG. 1 shows a portion of an example rotary implement.

FIG. 1 illustrates selected portions of an example rotary implement 20. For instance, the rotary implement 20 may be a mower blade, a coulter blade or the like that is configured for use on a rotary machine. As will be described in more detail, the example rotary implement 20 has features for enhanced durability.

In the illustrated example, the rotary implement 20 includes a metallic body 22 that is rotatable, as indicated at R, about an axis A. For example, the rotation can be powered, such as direct-drive by an actuator, or unpowered, such as a "rolling" rotation. The metallic body 22 includes a tapered leading edge 24, which generally narrows in geometry from a base to a tip (from right to left in FIG. 1). The tapered leading edge 24 serves as a working surface of the rotary implement 20. That is, the tapered leading edge 24 is the primary location at which the rotary implement 20 cuts, strikes, meets or otherwise engages the material worked upon during its normal intended use.

The geometry or angle of tapered leading edge 24 may be relatively acute to form knife or cutting edge. Alternatively, the geometry or angle may be larger to provide a more blunt working surface. As can be appreciated, other tapered geometries may alternatively be selected based upon the intended end-use of the rotary implement 20.

The metallic body 22 is made of a first composition and has an interface surface 26 and an opposite, free surface 28. The free surface 28 is "free" with respect to having any additional metallic or other hard protective layers thereon. Thus, the free surface 28 may include paint or other similar polymer-based layers thereon.

A metallic layer 30 is attached to the tapered leading edge 24, in this case a bottom or backside of the tapered leading edge 24, and is harder than the metallic body 22. The metallic layer 30 has a first side surface 32 that is attached to the interface surface 26 and a second, free side surface 34 located opposite from the first side surface 32. The free side surface 34 is "free" with respect to having any additional metallic or hard protective layers thereon. The free side surface 34 may, at least initially, include paint or other similar polymer-based layers thereon. The metallic layer 30 has a second, different composition from the first composition of the metallic body 22.

In some examples, the metallic layer 30 is on the bottom of the rotary implement 20 relative to the orientation of the rotary implement 20 in its normal intended use, while the free surface 28 of the metallic body 22 is on top. The disclosed arrangement of the metallic layer 30 on the bottom of, or at least on only one side of, the tapered leading edge 24 provides a self-sharpening effect. Due to the difference in hardness' between the first composition and the second composition, the metallic body 22 at the tapered leading edge 24 wears and erodes away more rapidly than the metallic layer 30. The dissimilar wear and erosion rates of the metallic body 22 and the metallic layer 30 maintain a cutting edge on the metallic layer 30 at the tip of the tapered leading edge 24. For non-cutting working surface the effect is self-maintaining geometry.

The first composition of the metallic body 22 and the second composition of the metallic layer 30 are selected to cooperate with respect to the protection provided by the metallic layer 30 and the resistance of the metallic layer 30 to cracking, spallation and the like. In one example, the first composition is a steel composition and the second composition is one of a nickel-based composition, a cobalt-based composition or an iron-based composition. The steel composition of the metallic body 22 can be heat treated to enhance hardness and toughness. For example, the steel can be austempered to a bainitic microstructure.

In a further example, the steel of the first composition is a boron-containing steel composition. The nickel-based composition, cobalt-based composition or iron-based composition of the second composition can include alloy elements in individual amounts of 0.1-20% by weight of boron, silicon, chromium, iron (for nickel- and cobalt-based alloys), carbon, manganese, nickel (for iron- and cobalt-based alloys), tungsten and combinations thereof. In further examples, the second composition is a composition set forth in the Table below.

TABLE

Example Compositions 1-4, by weight percentage.

| Element | Example 1 | Example 2 | Example 3 | Example 4 |
|---|---|---|---|---|
| Boron | 3 | 3.29 | 3.08 | 2 |
| Carbon | 0.7 | 2.18 | 1.98 | 0.6 |
| Chromium | 14.3 | 14.44 | 14.12 | 12.35 |
| Cobalt | — | — | — | Bal. |
| Iron | 4 | Bal. | Bal. | 1.3 |
| Manganese | — | 0.31 | 0.5 | — |
| Nickel | Bal. | 5.72 | 5.64 | 23.5 |
| Silicon | 4.25 | 3.09 | 2.74 | 1.9 |
| Tungsten | — | — | — | 7.6 |

In a further example, the metallic body 22 defines a first hardness H1 (hardness Vickers) and the metallic layer 30 defines a second hardness H2 (hardness Vickers) such that a ratio of H2/H1 is from 1.0 to 4.5. In use, because the hardnesses of the metallic body 22 and the metallic layer 30 are different, the harder metallic layer 30 does not wear as rapidly as the metallic body 22. However, if the hardness' of the metallic body 22 and the metallic layer 30 are close, the metallic body 22 and the metallic layer 30 will wear at approximately equivalent rates, thus blunting or otherwise changing the geometry of the tapered leading edge 24. Alternatively, if the hardness of the metallic layer 30 is too high, the metallic layer 30 can crack from stone impact or the like, and thus provide less protection. The disclosed range of the ratio of H2/H1 therefore represents a favorable combination of resistance to cracking/impact and relative wear/erosion between the metallic body 22 and the metallic layer 30, which thus enhances durability of the rotary implement 20.

In a further example, the ratio of H2/H1 is greater than at least 1.67 and the metallic layer 30 has an average thickness t that is one millimeter or less. In further examples, the average thickness t of the metallic layer 30 is approximately 0.7 millimeters or less than 0.7 millimeters. In other examples, the thickness t can be greater than 1 millimeter.

In further examples, the metallic layer 30 can have a hardness H2 of no less than 700 HV (Vickers hardness) and the metallic body has a hardness H1 of 300-600 HV. In a further example the hardness H2 is no less than 1000 HV. In one further example, the hardness H2 is 700-1300 HV.

In this example, the metallic body 22 extends from a tip 24a of the tapered leading edge 24 to an opposed end 36. The metallic layer 30 extends along only the tapered leading edge 24 and not along the remainder of the metallic body 22 toward the opposed end 36. That is, the metallic layer 30 extends from approximately the tip 24a to a location L that aligns with a transition of the metallic body 22 from a tapering shape to a non-tapering shape, such as to a uniform thickness portion 22a of the metallic body 22.

In the illustrated example, the metallic layer 30 is directly attached to the interface surface 26 of the metallic body 22. For example, the metallic layer 30 is directly metallically bonded to the interface surface 26 of the metallic body 22.

Figure 2:
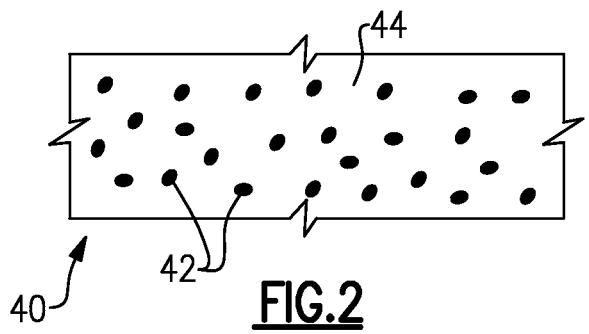
FIG. 2 shows a microstructure of a portion of a metallic layer of a rotary implement.

As discussed above, the second composition of the metallic layer 30 can include a nickel-based composition, cobalt-based composition or iron-based composition. FIG. 2 shows an example microstructure 40 of the metallic layer 30. In this example, the microstructure 40 includes tungsten carbide 42 that is dispersed in a matrix 44. For example, the matrix 44 can be a nickel-based composition, cobalt-based composition or iron-based composition. In another example the overall composition of the metallic layer 30 includes, by weight, 10-90% of the tungsten carbide and a remainder of the matrix 44. In a further example, the metallic layer 30 includes, by weight, 10-50% of the tungsten carbide and a remainder of the matrix 44. As can be appreciated, other example can exclude the tungsten carbide 42 such that the metallic layer 30 has only the nickel-based composition, cobalt-based composition or iron-based composition.

Figure 3:
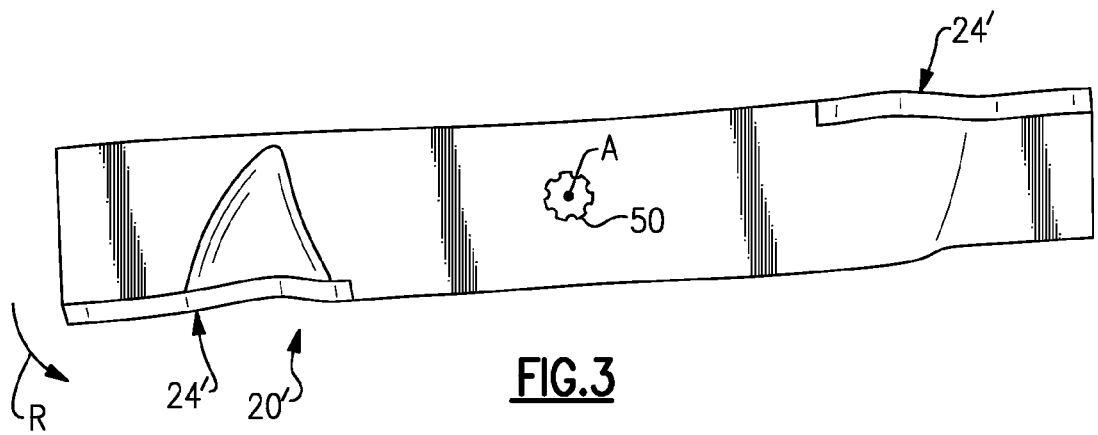
FIG. 3 shows a rotary implement mower blade.

As can also be appreciated, the overall geometry of the rotary implement 20 can vary depending upon the intended end-use. FIG. 3 illustrates a top view of an example of a rotary implement 20', where like reference numerals designate like elements that are understood to incorporate the same features and benefits of the corresponding elements. In this example, the rotary implement 20' is an elongated blade that has a connection feature 50 in a central portion thereof and tapered leading edges 24' at opposed ends thereof. The metallic layer 30 (not in view) is located on the opposite, backside of the rotary implement 20'.

Figure 4A:
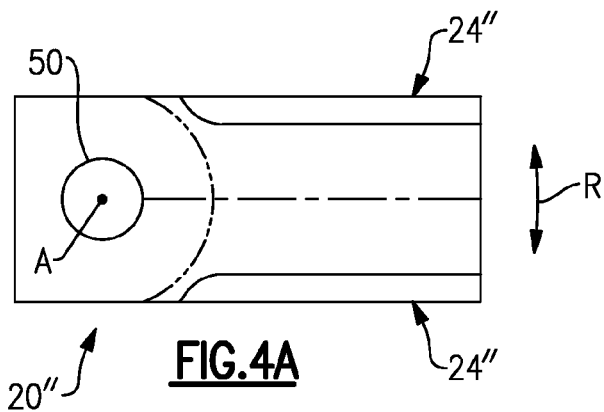
FIG. 4A shows another example rotary implement mower blade.
Figure 4B:
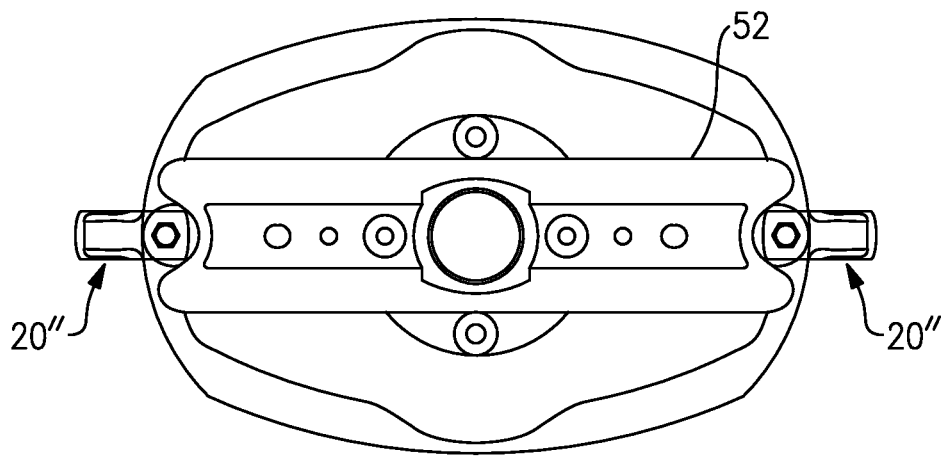
FIG. 4B shows a cutter bar and rotary implement of a mower.

FIG. 4A illustrates a top view of another embodiment of a rotary implement 20" that also has two tapered leading edges 24". In this example, the rotary implement 20" is configured to be used to rotate either a clockwise or counterclockwise direction. For example the rotary implement 20" can be rotated in one direction such that one of the tapered leading edges 24" is used and then flipped over such that the other of the tapered leading edges 24" is then used. The metallic layer 30 (not in view) is located on the opposite, backside of the rotary implement 20". The rotary implement 20" can be attached to a cutter bar 52 or a rotary machine, as shown in FIG. 4B.

Figure 5:
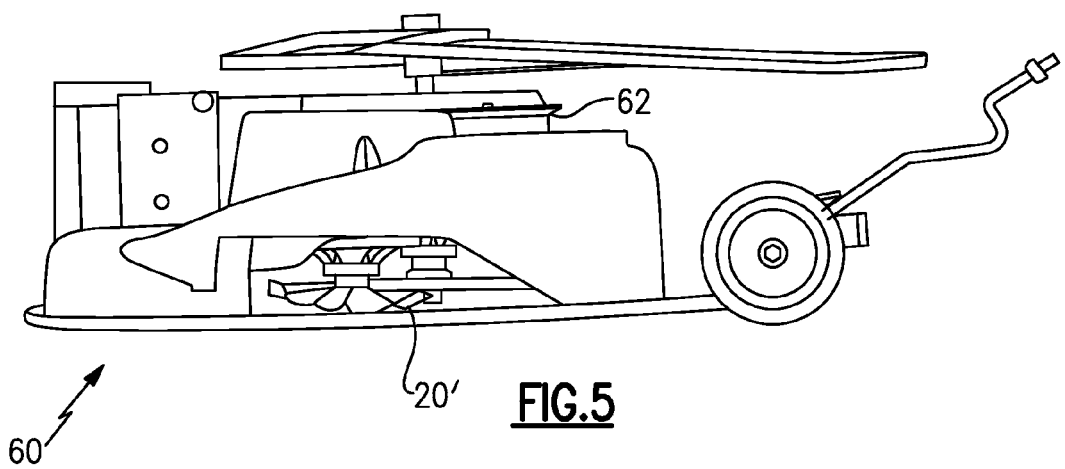
FIG. 5 shows a side view of a rotary machine having a rotary implement.
Figure 6:
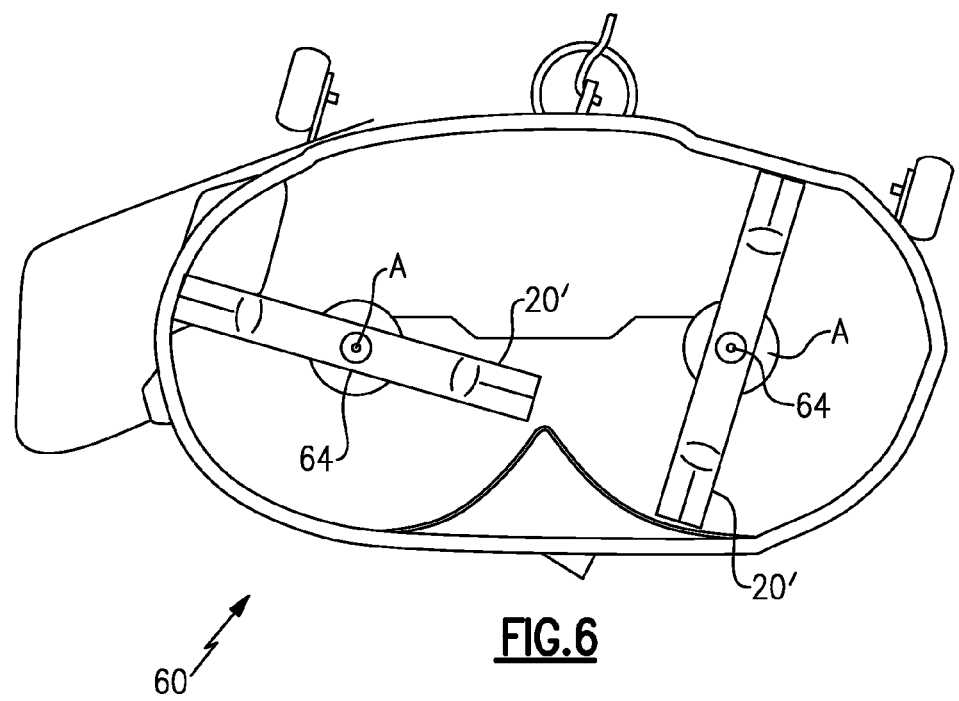
FIG. 6 shows a bottom view of the rotary machine of FIG. 5.

FIGS. 5 and 6 illustrate schematic views of another example rotary machine 60 that, in this example, includes multiple rotary implements 20'. As can be appreciated, the rotary machine is a non-limiting example and can vary from the design shown. In simple form, the rotary machine 60 includes an actuator 62 and the rotary implement 20' operably coupled to the actuator 62. In this case, the rotary implement 20' is connected through a known type of connection feature 64. In use, the actuator 62 drives the rotary implement 20' to rotate about axis A by way of the connection feature 64.

Figure 7:
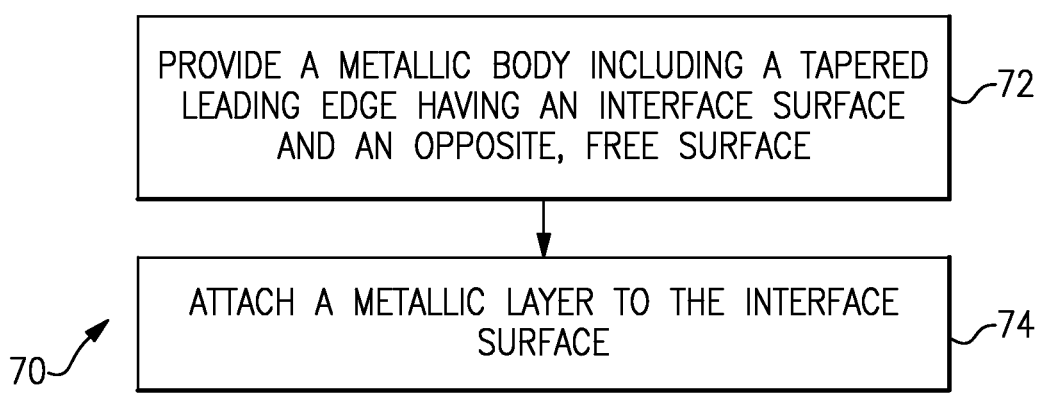
FIG. 7 shows a method for making a rotary implement.

FIG. 7 schematically illustrates an example method 70 for making a rotary implement, such as any of the rotary implements disclosed herein. In this example, the method 70 includes at least step 72 and step 74. Step 72 includes providing the metallic body 22 including the tapered leading edge 24 having the interface surface 26 and the opposite, free surface 28. Step 74 includes attaching the metallic layer 30 to the interface surface 26.

The method or techniques that are utilized to attach the metallic layer 30 to the metallic body 22 are not limited to any particular type but can include, for example, powder cladding or slurry deposition to produce a dense layer as the metallic layer 30. Thermal spraying can also be used to produce a porous layer as the metallic layer 30. In another alternative, the metallic layer 30 can be attached to the metallic body 22 by welding (e.g., electrical or plasma transfer arc) or inductive heat fusing. Given this description, one of ordinary skill in the art will be able to recognize other suitable attachment techniques to meet their particular needs.

In the powder cladding technique, a powder of the second composition (for the metallic layer 30) is applied onto the interface surface 26 and then consolidated (i.e., fused together) using an energy beam. For example, the energy beam is a laser. In one example the laser is a diode laser and the control parameters thereof with respect to laser power, traverse speed and the like can be controlled to achieve a desirable thickness of the metallic layer 30. For example, the laser power is 4-6 kilowatts, the traverse speed is 1.5 meters per minute and the powder application rate is 28 grams per minute. One or more deposition passes of applying and fusing the powder can be used to achieve a desired thickness.

In slurry deposition, the powder of the second composition (for the metallic layer 30) is included in a slurry with a carrier fluid. The slurry is then applied onto the interface surface 26 of the metallic body 22 and the carrier fluid is then removed through evaporation. The deposited powder is then consolidated to fuse the powder thereby form the metallic layer 30. The consolidation can be conducted by subjecting the implement to a heat treatment at a fusing temperature approaching the melting temperature of the composition. In a further example, the slurry can additionally include a binder such that a self-supporting green body is produced once the carrier fluid is removed. The green body can then be machined to a desired geometry or thickness prior to consolidation. Thus, the metallic layer 30, which is very hard, can be formed to near-net shape with minimal or no machining of the metallic layer 30.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is for explanation rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A rotary implement comprising:
   a metallic body rotatable around an axis, the metallic body including a tapered leading edge having an interface surface and an opposite, free surface, the metallic body having a first composition;
   a metallic layer having a first side surface attached to the interface surface and a free, second side surface opposite from the first side surface, the metallic layer having a second, different composition from the first composition;
   wherein the first composition includes a boron-containing steel composition and a bainitic microstructure; and
   wherein the free surface includes a polymer-based layer thereon.

2. The rotary implement as recited in claim 1, wherein the tapered leading edge is a cutting edge.

3. The rotary implement as recited in claim 1, wherein the second composition is a nickel-based composition.

4. The rotary implement as recited in claim 1, wherein the second composition is a cobalt-based composition.

5. The rotary implement as recited in claim 1, wherein the second composition is an iron-based composition.

6. The rotary implement as recited in claim 1, wherein a second hardness H2 of the metallic layer is greater than 1000 HV and a first hardness of the metallic body is between 300-600 HV.

7. The rotary implement as recited in claim 1, wherein the metallic body has a first hardness H1 and the metallic layer has a second hardness H2 such that a ratio of H2/H1 is from 1.0 to 4.5.

8. The rotary implement as recited in claim 7, wherein the ratio is at least 1.67 and the metallic layer has an average thickness of less than one millimeter.

9. The rotary implement as recited in claim 1, wherein the metallic layer extends along only the tapered leading edge of the metallic body.

10. The rotary implement as recited in claim 1, wherein the first side surface of the metallic layer is directly metallically bonded to the interface surface of the tapered leading edge.

11. The rotary implement as recited in claim 1, wherein the second composition includes tungsten carbide dispersed through a matrix selected from the group consisting of nickel-based metal, cobalt-based, and iron-based metal.

12. The rotary implement as recited in claim 11, wherein the second composition has, by weight, 10-90% of the tungsten carbide and a remainder of the matrix.

13. A rotary machine comprising:
    an actuator;
    a rotary implement operably coupled to the actuator, the rotary implement including a metallic body rotatable around an axis, the metallic body including a tapered leading edge having an interface surface and an opposite, free surface, the metallic body having a first composition, and a metallic layer having a first side surface attached to the interface surface and a free, second side surface opposite from the first side surface, the metallic layer having a second, different composition from the first composition;
    wherein the first composition includes a boron-containing steel composition and a bainitic microstructure; and
    wherein the free surface includes a polymer-based layer thereon.

14. The rotary machine as recited in claim 13, wherein the first composition is a steel composition and the second composition is selected from the group consisting of a nickel-based compositions, cobalt-based compositions and iron-based compositions.

15. The rotary machine as recited in claim 13, wherein the metallic body has a first hardness H1 and the metallic layer has a second hardness H2 such that a ratio of H2/H1 is from 1.0 to 4.5.

16. The rotary machine as recited in claim 15, wherein the ratio is at least 1.67 and the metallic layer has an average thickness of less than one millimeter.

17. A method for making a rotary implement, the method comprising:
    providing a metallic body including a tapered leading edge having an interface surface and an opposite, free surface, the metallic body having a first composition;
    attaching a metallic layer to the metallic body, the metallic layer including a first side surface that is attached to the interface surface and a free, second side surface opposite from the first side surface, the metallic layer having a second, different composition from the first composition;
    wherein the first composition includes a boron-containing steel composition and a bainitic microstructure; and wherein the free surface includes a polymer-based layer thereon.

18. The method as recited in claim 17, wherein the attaching includes applying a powder having the second composition to the interface surface, and consolidating the powder using an energy beam.

19. The method as recited in claim 17, further comprising establishing the metallic body to have a first hardness H1 and the metallic layer to have a second hardness H2 such that a ratio of H2/H1 is from 1.0 to 4.5.

20. The method as recited in claim 17, wherein the attaching comprises applying a slurry including a powder of the second composition and a carrier fluid to the interface surface, removing the carrier fluid and consolidating the powder to form the metallic layer.

* * * * *